May 26, 1964  J. H. WILDE  3,134,901
NUCLEAR RADIATION GLOW TUBE INDICATOR AND CALIBRATION MEANS
Filed Sept. 29, 1961

INVENTOR
JAMES H. WILDE

BY *Raymond W. Cotton*
ATTORNEY

United States Patent Office 3,134,901
Patented May 26, 1964

3,134,901
NUCLEAR RADIATION GLOW TUBE INDICATOR AND CALIBRATION MEANS
James H. Wilde, Clinton, Tenn., assignor, by mesne assignments, to Small Business Administration
Filed Sept. 29, 1961, Ser. No. 141,890
6 Claims. (Cl. 250—83)

This invention relates to a nuclear radiation indicator suitable for detecting and measuring nuclear radiation.

By obviating the need for such instruments as galvanometers and milliammeters, the present invention provides an inexpensive and rugged device capable of being produced in small sizes, light in weight and involving substantially no maintenance.

It is among the objects of this invention to provide a nuclear radiation indicator comprising a nuclear radiation-electrical transducer having an output circuit including a first gas glow tube, a comparison circuit including a source of predetermined voltage and a second gas glow tube, means supporting the tubes, modifying means for controlling the output of the second gas glow tube, and calibrated means for adjusting the modifying means. The modifying means may include a light wedge, the modifying means may be connected in the comparison circuit, and in the latter case, the modifying means may assume the form of a variable resistor or a frequency varying device. The tubes may be enclosed in a housing containing a window through which the tubes can be viewed. The calibrated means may be connected to the modifying means and rendered accessible to the operator to facilitate adjustment as well as reading the calibrations.

A more complete understanding of the invention will follow from a detailed description of the accompanying drawings wherein.

Figure 1:
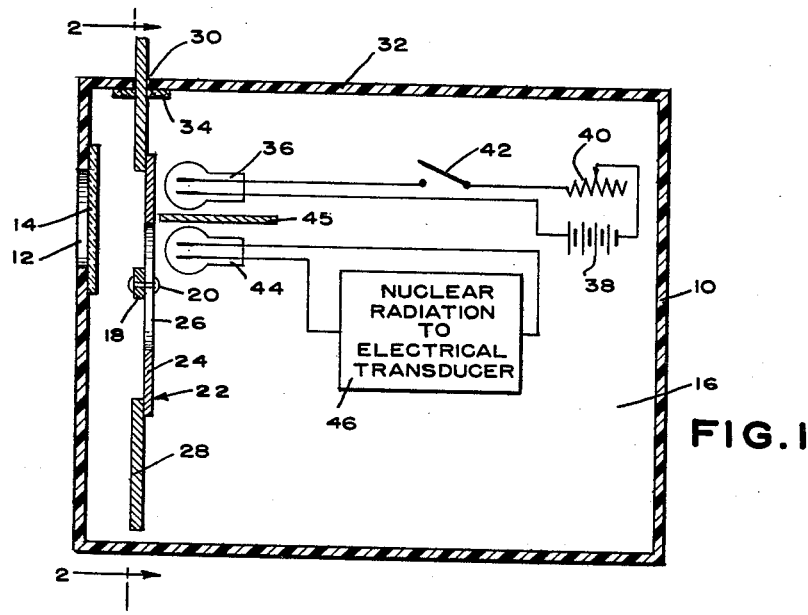
FIG. 1 is a sectional elevation, partially diagrammatic, depicting one form of the invention.

A housing 10 may be composed of any suitable material such as metal or a plastic composition, and contains a window 12 to which the eye of the observer can be applied. Except for the window, the housing is preferably light tight and when the observer applies his eye to the window, extraneous light will be excluded at that portion as well. A light transmitting cover 14 for the window 12 will exclude dust from the housing.

Between the side walls 16 of the housing, only one of which side walls is shown, there extends a bar 18 for a pivot 20 on which a disc 22 is rotatably supported. The peripheral portion 24 of the disc constitutes a light wedge of progressively increasing density in a circumferential direction and the inner portion 26 thereof is substantially clear.

Suitably connected to the disc 22, as by adhesive, an annular calibrated element 28 is provided so that a portion will extend through a slot 30 in one of the walls 32 of the housing. To prevent the entry of extraneous light, a suitable shield 34, composed of felt, rubber, or the like, is interposed between the housing wall and the annular element.

A gas glow tube 36 is suitably supported within the housing so as to register with the peripheral portion 24 of the disc 22 so that by adjustment of the disc 22 by manipulation of the calibrated element 28 by the operator, the intensity of light produced by the tube 36 as perceived by the operator through the window 12 can be adjusted. The electrodes of the gas glow tube 36 are connected in circuit with a battery 38 connected in series with a rheostat 40 and a switch 42. The rheostat 40 and the switch 42 can be manipulated from points outside of the housing in any suitable manner that may be desired.

Another gas glow tube 44 is disposed within the housing to register with the clear portion 26 of the disc 22, a light baffle 45 separating the glow tubes. The terminals of the tube 44 are connected to a nuclear radiation-electrical transducer 46 which will supply pulses to the tube 44 at a frequency proportional to the intensity of the nuclear radiation to which it is exposed.

Figure 2:
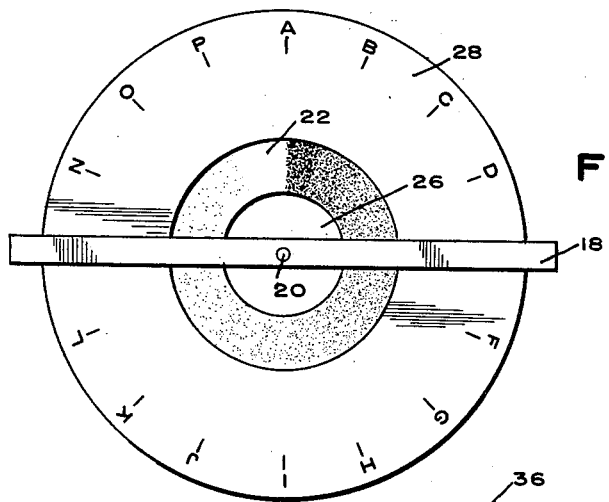
FIG. 2 is a view taken along line 2—2 of FIG. 1.
Figure 3:
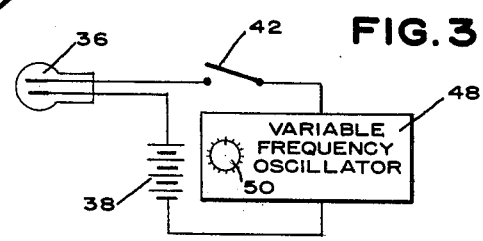
FIG. 3 is a circuit diagram depicting a modified form of comparison circuit.

The calibrations on the annular element 28 have been indicated by letters in FIG. 2 and may correspond with the values of radiation for which the indicator is intended. A practical range may extend from 10 milliroentgens per hour to 100 roentgens per hour. The scale may be linear or logarithmic. As will be clear from the stippling employed in FIG. 2, the light wedge provided by the disc 22 has a progressively increasing density in a circumferential direction. Assuming that the transducer 46 produces current to excite the gas glow tube 44, by rotation of the calibrated element 28 and the disc 22, with the switch 42 closed, the apparent intensity produced by the gas glow tube 36 can be made to match that of the gas glow tube 44. When such a condition is reached, the radiation count can be read directly from the calibrated element 28. Should it be desired to eliminate the light wedge, the intensity of the gas glow tube 36 can be adjusted by a variable resistor 40 to produce an intensity of illumination equal to that of the gas glow tube 44. Another arrangement for producing matching intensities has been depicted in FIG. 3 wherein a variable frequency oscillator 48 is included in the circuit of the gas glow tube 36. By adjustment of a calibrated knob 50, the frequency of pulses applied to the gas glow tube 36 can be varied to produce an apparent intensity corresponding with that of the gas glow tube 44. In this case, the radiation count will be read from the position of the knob 50.

Such variations of the foregoing illustrations as will suggest themselves to those skilled in the art are contemplated as coming within the scope of the appended claims.

I claim:

1. A nuclear radiation indicator comprising a nuclear radiation-electrical transducer having an output circuit including a first gas glow tube, a comparison circuit including a source of predetermined voltage and a second gas glow tube, housing means supporting said tubes, a sight opening in said housing means through which both of said gas glow tubes are visible for comparison, modifying means for controlling the output of said second gas glow tube, and calibrated means for adjusting said modifying means.

2. A nuclear radiation indicator according to claim 1 wherein said modifying means includes a light wedge.

3. A nuclear radiation indicator according to claim 1 wherein said modifying means is connected to said comparison circuit.

4. A nuclear radiation indicator according to claim 3 wherein said modifying means is a variable resistor.

5. A nuclear radiation indicator according to claim 3 wherein said modifying means is a frequency varying device.

6. A nuclear radiation indicator according to claim 1 wherein said calibrated means is connected to said modifying means.

References Cited in the file of this patent

UNITED STATES PATENTS

| | | |
|---|---|---|
| 2,496,886 | Molloy et al. | Feb. 7, 1950 |
| 2,666,857 | McLareen et al. | Jan. 19, 1954 |
| 2,839,688 | Anton | June 17, 1958 |
| 2,982,857 | Clarke | May 2, 1961 |
| 3,031,577 | Garbellano | Apr. 24, 1962 |